United States Patent
Rohlfs

(10) Patent No.: US 8,722,002 B2
(45) Date of Patent: May 13, 2014

(54) SYSTEM FOR RECYCLING CAPTURED AGGLOMERATED DIESEL SOOT AND RELATED METHOD

(75) Inventor: Michael B. Rohlfs, Northbrook, IL (US)

(73) Assignee: Dearborn Financial, Inc., St. Charles, IL (US)

( * ) Notice: Subject to any disclaimer, the term of this patent is extended or adjusted under 35 U.S.C. 154(b) by 0 days.

(21) Appl. No.: 13/604,103

(22) Filed: Sep. 5, 2012

(65) Prior Publication Data

US 2013/0055699 A1    Mar. 7, 2013

Related U.S. Application Data

(60) Provisional application No. 61/531,126, filed on Sep. 6, 2011.

(51) Int. Cl.
*B01D 37/00* (2006.01)
*C10B 49/02* (2006.01)
*C10B 53/00* (2006.01)
*C10J 3/60* (2006.01)

(52) U.S. Cl.
USPC ......... 423/215.5; 588/300; 588/321; 588/404

(58) Field of Classification Search
USPC .................. 423/215.5; 588/300, 321, 404
See application file for complete search history.

(56) References Cited

U.S. PATENT DOCUMENTS

2007/0007170 A1   1/2007   Strack et al.
2013/0149767 A1*  6/2013   Marion et al. ............... 435/168

FOREIGN PATENT DOCUMENTS

| EP | 2078832 A2 | 7/2009 | |
|---|---|---|---|
| JP | 53-123372 A | * 10/1978 | ............ 588/404 |
| JP | 04-332570 A | * 11/1992 | ............ 588/321 |
| JP | 2005-81243 A | * 3/2005 | ............ 588/321 |
| WO | 03004838 A1 | 1/2003 | |
| WO | 2010106540 A1 | 9/2010 | |

OTHER PUBLICATIONS

International Search Report and Written Opinion regarding International Application No. PCT/US2012/053820 mailed Feb. 26, 2013.

* cited by examiner

*Primary Examiner* — Timothy Vanoy
(74) *Attorney, Agent, or Firm* — Harness, Dickey & Pierce, P.L.C.

(57) ABSTRACT

A method of recycling captured agglomerated soot captured by and collected from a diesel emission control after-treatment (DECAT) system, the method comprising collecting captured agglomerated diesel soot (CADS) as a feedstock, loading the CADS into a controlled thermochemical conversion (TCC) process reactor, employing time-phased heat and pressure in the controlled TCC process reactor until the CADS sufficiently decompose to reclaim solids, liquid fuels and gases, piping pyrolysis oils (tars) and vapors produced in the controlled TCC process reactor to chambers, cooling and condensing the pyrolysis oils and vapors into a liquid form, and recirculating a pyrolysis gas produced in the controlled TCC process reactor for use as a source of heat and power.

21 Claims, 5 Drawing Sheets

Fig. 1 – Prior Art

SYSTEM FOR RECYCLING CAPTURED AGGLOMERATED DIESEL SOOT AND RELATED METHOD

CROSS-REFERENCE TO RELATED APPLICATIONS

This application claims priority to U.S. Provisional Patent Application No. 61/531,126 filed 6 Sep. 2011, which application is herein expressly incorporated by reference.

FIELD

The present disclosure pertains to a system for recycling captured agglomerated diesel soot (CADS). The present disclosure more particularly pertains to a system for recycling captured agglomerated diesel soot collected from emission control systems. The present disclosure also pertains to an eco-friendly method of recycling captured agglomerated diesel soot for emission control systems.

INTRODUCTION

It is well known that particulate matter emitted by diesel engines damages respiratory health and the environment, which are compelling global problems that are especially burdensome for developing countries compromised by the need to employ more affordable but less desirable fossil fuels for the sake of economic growth. Problems caused by diesel emissions in developing countries are expected to intensify in the absence of viable and affordable PM remediation options, if forecasts from such respected sources as the United Nations ("UN"), the International Energy Agency and the Organization of Petroleum Exporting Countries prove to be accurate, i.e., if the economic growth of developing countries outpaces growth in member countries of the Organization for Economic Co-operation and Development (OECD) and if growth in the use of diesel fuel exceeds the growth of most other energy sources.

Businesses and governments in the wealthier OECD countries have spent many billions of dollars on initiatives aimed at reducing PM emitted by a variety of engines, especially diesel PM. Unfortunately, those initiatives have, inter alia, contributed to material increases in global fuel prices by supporting the notion of Peak Oil centered round light sweet crude oil, which has become increasingly coveted for its low sulfur content. Diesel fuel prices have also risen due to the effects of refinery and pipeline upgrades and other logistics mandated by campaigns to complement ULSD fuel with "clean" new engines employing Advanced DECAT systems.

Advanced DECAT systems are designed, inter alia, to burn soot trapped on their filters, a process known as regeneration, before filter plug-ups raise engine backpressure to levels that increase fuel consumption, decrease power and may potentially even cause engine damage. Regeneration of Advanced DECAT systems occurs whenever engine exhaust is hot enough to burn soot. But if exhaust is not essentially hot enough, complex measures must be employed to enhance soot ignition, typically comprised of passive regeneration utilizing precious metal catalysts and/or assisted regeneration involving fuel injected into the exhaust stream.

Resorting to either form of Advanced DECAT system regeneration, in particular in the case of assisted regeneration involving fuel injection, which creates fuel penalties, results in an escalation of greenhouse gas (GHG) emissions. A host of notable scientists and climate experts believe that GHG emissions are major GW forces that contribute substantially to CC, a view generally shared by the UN's International Panel on Climate Change ("IPCC").

The aggregate costs and other effects of complex active components, sensitive precious metal catalysts, required ULSD fuel to avoid catalyst poison and counteractive conversion of SO2 to sulfate laden PM, and fuel penalty-related GHG escalation have impeded efforts to mass retrofit Advanced DECAT systems onto the many millions of awaiting diesel engines that are known to be relentless polluters in developing countries. Major concerns remain as to their price and reliability/durability, especially in countries where diesel fuels with high sulfur content render Advanced DECAT systems ineffective, if not inoperable.

Developing countries need viable solutions to reduce diesel PM more than ever and those that are truly affordable with functional sulfur tolerance characteristics would be considered especially innovative. Synergies created by implementing the present teachings as an integral part of the DECAT+ Recycling Solution will fill that void and help alleviate a myriad of inter-related energy concerns that are gridlocked in the developing world. Principal benefits derived from DECAT+Recycling (underlined for emphasis) are noted below.

Enhances the Affordability of DECAT Retrofits that are more Durable/Reliable

Advanced DECAT systems trialed thus far on trucks and buses in developing countries have generally been unreliable and prohibitively expensive due to the precious metal catalysts and complex active components needed for regeneration. Further, they are impractical for mass implementation due to some well documented vulnerabilities, which inter alia include: (a) intolerance of non-ULSD fuels, since sulfur is known to poison precious metal catalysts, (b) loss of PM emission control efficiency, which falls to 0% when 150 ppm sulfur diesel fuel is employed and (c) an increase in the counteractive conversion of SO2 to sulfate laden PM as sulfur levels exceed 150 ppm, reflecting the impact of high exhaust temperature profiles (which favor SO3 production) and the presence of precious metal catalysts—to the point where PM emissions more than double their baseline levels when 350 ppm sulfur diesel fuel is employed. DECAT systems that instead agglomerate, capture and collect soot are more reliable and thus durable (especially in urban, stop-and-go drive cycles where relatively low exhaust temperature environments tend to cause Advanced DECAT system failures), cost less due to their simple passive designs and tolerate diesel fuels commonly employed in developing countries (frequently containing 350+ ppm sulfur; many even exceed 1,000 ppm sulfur levels).

Economic and other benefits associated with the disposal of CADS by the method of this invention help offset the already-lower costs of compatible DECAT systems but do not apply to soot burning Advanced DECAT systems. After factoring synergistic benefits of this invention, the net costs of compatible DECAT system retrofit applications comprise only a small fraction of the all-in costs associated with Advanced DECAT systems.

Enhances Respiratory Health and the Environment

Although Advanced DECAT systems installed with clean new engines employing ULSD fuel may effectively reduce government benchmark PM levels, the harmful ultrafine and nano particles that nonetheless escape tailpipes in those applications: (a) are approximately the same in count as those emitted under baseline (sans after-treatment) conditions by dirty old engines employing high sulfur fuels; (b) pose more serious threats to respiratory health because they penetrate deeper into lung tissue; and (c) cause damage in the atmosphere as they bond with other elements residing there to form secondary PM.

The DECAT systems compatible with this invention alternatively produce benefits by employing exhaust cooling embodiments. Reducing exhaust temperature forces the condensation of heavy VOC fractions into nano-size particles that can be captured at high frequencies and eliminated before exhaust leaves the tail pipe. Adsorption of ultrafine and volatile nano particles onto larger (especially black carbon) PM species is enhanced substantially when the bonding particles migrate through agglomerative filters prior to being captured and collected.

The present teachings provide for an eco-friendly disposition of the agglomerated diesel soot captured and collected by compatible DECAT systems whereby exhaust (VOC) toxicity gets eliminated while CADS feedstock is effectively being produced for recycling via TCC processes.

Expedites the Reversal of GW Forces and Resultant CC

Whereas Advanced DECAT systems escalate GHG emissions by using precious metal catalysts and/or extra fuel injected into exhaust streams to enhance soot burning, this invention is part of an eco-friendlier TCC process-based solution that is focused on the efficient disposal of PM soot collected from compatible DECAT systems.

In the highly publicized and controversial aftermath of the December 2009 Copenhagen Summit holding the UN Framework Convention on Climate Change and the $5^{th}$ Meeting of the Parties of the Kyoto Protocol, noxious black carbon soot ("BCS") emitted by diesel engines has increasingly attracted attention as a major GW (and resultant CC) coefficient with local and regional impact, especially in developing countries and icy/snowy regions. This stems from the fact that, while drifting in the atmosphere or falling/settling on the ground, BCS efficiently absorbs sunlight, warms up and radiates heat. BCS accumulating on snow and ice (especially in crucial Arctic and Himalayan regions) reduces albedo (i.e., ability to reflect light), causing a local melt that reduces reflectivity even further. The result is a positive feedback loop of warming.

While PM remediation options have long been sought for a variety of health reasons, global organizations have more recently targeted BCS in light of a mounting stack of published studies by aerosol scientists and climate experts who cite its elimination as the most expedient means capable of reversing CC caused by GW forces in the short term, generally considered to be the next two (2) decades. This is due to the fact that the atmospheric life of BCS is only a few weeks versus many decades for CO2 and other GHG.

A consensus appears to have been formed that near-term initiatives to reduce BCS emissions should be expedited in developing countries, not just for obvious health reasons but to buy valuable extra time needed for longer-term GHG mitigation initiatives, which are viewed more as the prime responsibility of developed nations. This invention is an integral part of a novel dual-faceted solution (the DECAT+Recycling Solution) designed specifically to advance such near-term initiatives, which can be accomplished via the following: (i) TCC of the complex multifaceted GW culprit (BCS), typically the major component of CADS, for decomposition into CB or CBFS (as the case may be), as well as other valuable byproducts; and (ii) selectively allow sulfate emissions to provide vitally important atmospheric cooling forces on a planned and managed basis while BCS gets eliminated, as more fully explained below.

Relieves Gridlock Tied to a Myriad of Inter-Related Energy Issues Burdening Developing Countries The present teachings address inter-related energy issues so complex that a "chicken and egg" gridlock is languishing in terms of which to deal with first. Fortunately, the gridlock can be relieved in this case without onerous cost and logistical burdens tied to ULSD-centric initiatives being pursued by much wealthier OECD countries. Synergies created when implementing the present teachings with compatible DECAT systems will enable developing countries to proactively address compelling problems, which are noted below alongside their respective solutions:

Retrofit 20,000,000+High-Emitter Engines (aka superemitters) hitherto feared as lost causes, with compatible DECAT systems so affordable and tolerant of high sulfur fuels that developing countries will be better able to grant subsidies and/or legislate mandates to assure compliance with meaningful emission standards previously considered impracticable. Absent the synergies created by the DECAT+ Recycling Solution defined herein, high-emitter engines will keep spewing noxious GW-force BCS for many years to come, assuming that the typically long lifespan of diesel engines holds true.

Sidetrack the Onerous Effects of Extreme Desulfurization Campaigns since DECAT systems compatible with this invention lack precious metal components vulnerable to sulfur poison. It is instructive in this case to consider the historical progression of regulated diesel fuel campaigns waged over time by Environmental Protection Agencies ("EPAs") in OECD countries.

Sulfur levels in diesel fuels employed by highway and non-road vehicles were for quite some time limited to 0.5% (5,000 ppm) per ASTM international standards. During the 1990's, fuel quality became more regulated by EPAs, with the first major move dropping the limit to a "low" level of 0.05% (500 ppm), driven at the time by some legitimate desires to reduce sulfur's impact on PM emissions (aka sulfate particulates, discussed more fully herein). However, it was eventually discovered that incremental efforts needed to reduce sulfur content below 500 ppm did not commensurately lower the PM measured in diesel exhaust. They also have proven to be very expensive propositions.

Despite the factors noted in the preceding paragraph, in light of ongoing Advanced DECAT system failures being experienced in the field, along with related problems tied to the counteractive conversion of SO2 gases to sulfate laden PM, more aggressive desulfurization initiatives (to 350 ppm and then 50 ppm) were implemented, essentially as technology enablers. Eventually, they were forced all the way down to ULSD level (15 ppm; 0.0015%) promulgated as part of stringent OEM emission control standards mandated for certain model year 2007-and-later diesel vehicles.

Developing country markets that adopt the DECAT+Recycling Solution can avoid the onerous burdens associated with the OECD's penchant for extreme desulfurization campaigns while still substantially reducing pollution and improving their environment and health.

Avoid Costly Refinery, Pipeline and Other Logistics tied to the issues noted above. Diesel fuels contain chemically bound sulfur, which depends greatly on crude oil quality; that is, inter alia, why light sweet crude is favored over heavy sour grades.

Refineries reduce sulfur by employing sophisticated hydrocracking and hydrotreating modules but those are unfortunately very costly propositions. In the U.S., individual refinery upgrades of that nature have exceeded $1 billion, scenarios which are at the least impractical for neglected developing country markets, especially when considering that the end game essentially involves reducing fuel sulfur content from an arguably negligible level (0.1% or so) to ULSD (0.0015%) contrived merely for the sake of attempting to salvage overly sulfur-sensitive Advanced DECAT systems that are going to remain prohibitively expensive in any event.

Dedicated sulfur-free pipelines and other delivery systems are also required to insure that ULSD won't be mixed with "dirtier" fuels lest the wrath of sulfur poison will take its toll. Developing countries can avoid those costly logistical burdens by instead pursuing the DECAT+Recycling Solution outlined herein.

Provide a Much Needed Counter-Force to Inflationary Peak Oil Bias that has permeated global energy markets, which can effectively be achieved by causing projected future crude oil demand to fundamentally shift away from light sweet crude oil over to heavy sour grades. Light sweet crude oil is widely perceived, especially by those in the energy trading community, as the world's most coveted energy source. Light sweet crude oil reserves have "peaked", or will soon, depending on which analyst/pundit one may choose to believe.

With relatively few naysayers at present, the notion of Peak Oil has helped ratchet up oil prices during much of the $21^{st}$ Century (paralleling the emergence of ULSD). Peak Oil helps feed an increasingly bullish trading bias that incites speculators to bid up prices whenever the global economy shows signs of growth. It also moves arbitragers on occasion to substantially widen discounts favoring light sweet crude over the "lesser" grades with higher sulfur content.

In 2008, when heavily traded Brent and West Texas Intermediate (WTI) benchmark light sweet crude oil futures contract prices hovered near $150 per barrel, cash market discounts to induce refiners to buy heavy sour grades exceeded $25 per barrel. Pundits who aver about the extent to which light sweet crude reserves have peaked also predict $150 will be surpassed as soon as the global economy gets back on track. However, it could inflate a new energy market bubble destined to pop like the last one as its effects cause yet another global economic crisis, escalating volatility concerns that have already led to the deferral and cancellation of critical oil industry investment decisions.

Fundamentally (ignoring the technical forces of speculative traders who arguably cause absurd price spikes from time to time), the notion of Peak Oil bias inherently assumes, inter alia, that the petroleum refiners servicing developing yet economically challenged markets will inevitably bid against OECD counterparts (who lock up virtually all that is globally produced at the present) to process ULSD fuel that will eventually be adopted, presumably alongside Advanced DECAT systems. Such assumptions are misguided and arguably wasteful, given that global reserves of heavy sour crude are substantially higher than the light sweet variety and growing at a faster pace. Those assumptions also ignore the fact that substantial Asian and Middle East refinery capacity comes online this decade with much of it dedicated to processing heavy sour grades, albeit not necessarily with the intent of spending substantially more in order to produce ULSD fuel.

It is hard to envision financially challenged developing countries agreeing to divert many extra $ billions from vitally more important social and other programs to help underwrite costly refinery modules needed to reduce sulfur from satisfactory PM control levels (0.05%-0.1%) to ULSD (0.0015%) contrived essentially as a technology enabler favoring prohibitively expensive, sulfur intolerant Advanced DECAT systems. By employing this invention, such diversions can be avoided.

Facilitate Oceangoing Vessel ("OGV") Compliance with New Fuel and Emission Standards This introduction section has so far focused on scenarios whereby the TCC processing of CADS is the last phase of this invention's multifaceted DECAT+Recycling Solution. When dealing with land based (primarily truck and bus) applications, it is only practical for the DECAT facets (agglomeration, capture and collection) to be bifurcated from the Recycling facets.

It is neither logistically nor economically feasible to install Integrated DECAT+Recycling Systems onboard land based vehicles. On the other hand, OGV applications uniquely provide suitable economies of scale and spatial environments warranting the onboard installation of Integrated DECAT+Recycling Systems that are able to further incorporate the following novel synergistic features: (i) capturing toxic (VOC) vapors from OGV petroleum cargo storage areas for co-processing at those facets of this invention where CADS byproduct oils and vapors are cooled and condensed into reusable liquid fuels; and (ii) collecting hazardous OGV materials in the form of food, clinical, sanitary, solids, black water (sewage), ballast water, bilge water and scrubber system sludge waste for introduction to this invention's TCC reactor as incremental feedstock either co-processed with CADS or separately processed (as the case may be) with the byproduct fuels thereby generated being reused in the OGV's main or auxiliary engines and the byproduct gases being recirculated as an integral source of TCC reactor heat and power.

OGVs include passenger yachts, ships and oceanliners, container ships, bulk carriers, ro-ro ships, reefers, crude oil, chemical and gas tankers, tug boats and naval vessels. Since OGVs carry approximately 90% of world trade (including two-thirds of all oil and oil products globally consumed) covering tens of trillions in tonne-miles/year, vessel owners consider their relative environmental footprint to be light compared to other transport modes but they indisputably emit massive amounts of air pollution as their engines burn residual and distillate fuels with very high sulfur content (often as much as several thousand times that of ULSD), serving up hazardous cocktails of PM with VOC and PAH alongside SOx/SO2 and other pollutants.

Effective Jul. 1, 2010, shippers began facing new regulations to either burn fuels with lower sulfur content or employ after-treatment solutions that represent sustainable alternatives to the newly promulgated fuels by causing equivalent reductions in SOx/SO2 to help eliminate PM and other pollutants. The International Maritime Organization ("IMO") has coordinated with EPA's from countries (mainly OECD) located throughout the world to reduce sulfur limits in OGV fuels from 15,000 ppm to 10,000 ppm in Emission Controlled Areas (aka ECAs; generally within 200 miles of coastal ports). ECA sulfur limits are scheduled to drop to 1,000 ppm in 2015. The IMO elsewhere calls for sulfur limits to be reduced (or an after-treatment equivalent) in January 2012 from 45,000 ppm to 35,000 ppm, then to 5,000 ppm in 2020, although the latter level is contingent on a fuel-availability study to be completed in 2018.

Implementing the DECAT+Recycling Solution tied to this invention will enhance the compliance efforts of OGV owners that cannot afford (or in some cases even reliably operate with) lower sulfur fuels promulgated for implementation by the IMO and ECAs. Promulgated fuels are expected to cost considerably more (as much as 60+% has been evidenced already) than the fuels hitherto employed. In all likelihood, their future adoption may exacerbate Peak Oil fears by impeding efforts to balance crude oil reserves, production and refinery output in a globally practical fashion; ergo, the contingency associated with the 2018 fuel availability study.

OGV compliance can be enhanced by passing the PM-reduced exhaust flow of this invention, which is by then substantially rid of noxious BCS, VOC and PAH fractions, through any of several known marine scrubbers coming to market to address commercial opportunities emerging from the aforementioned IMO/ECA regulations. Some marine scrubbers exploit the natural buffering capacity of seawater to desulfurize said exhaust and discharge the harmless effluent into the sea, which also serves to prepare the SOx/SO2 scrubbed exhaust for extended NOx reduction after-treatment options such as EGR or SCR. In other cases, the PM-reduced exhaust can be passed through marine scrubbers employing ultra-low frequency electrolysis to reduce CO2 and NOx along with SOx/SO2. It should be noted that similar scrubber devices and extended after-treatment options can also be installed at land-based CADS Recycling facilities, in particular those that are located in the proximity of seawater.

With the present teachings, prior to any scrubber device being employed, the most hazardous and voluminous PM fractions of OGV exhaust (i.e., BCS, VOC, PAH) are already agglomerated, captured, collected and recycled via TCC processes into reusable solid, liquid fuel and gas byproducts; thus value is created from PM fractions that would otherwise constitute "scrubber sludge". As a result, major cost savings can be achieved by reducing attendant marine scrubber sludge infrastructure (from unknowingly excess levels hitherto provided) and special handling required onboard OGVs, as well as at certified sludge disposal/remediation facilities located onshore. Fuel byproducts generated by the Integrated DECAT+Recycling Systems for OGVs can be reused in the vessel's main or auxiliary engines and the byproduct gases can be recirculated as an integral heat and power source for the TCC reactor.

While fuel desulfurization generally yields meaningful environmental benefits in terms of reducing acid rain and secondary PM in heavily-populated land mass regions, it is arguably a precarious point in time to consider implementing more aggressive sulfur reduction initiatives on the high seas. In both the build-up to, and aftermath of, the December 2009 Copenhagen Climate Summit, a substantial portfolio of scientific research has emerged to emphasize the vital role sulfates play as the most effective cooling agents known to offset GW forces and resultant CC in the past few decades. In particular, they cite benefits in Northern Hemisphere regions attributed to the cooling effects of SOx-emitting OGVs passing between Asian and U.S. ports, as well as similarly crucial benefits in Himalayan glacier areas that serve as water reservoirs for more than one-sixth of the Earth's population, whilst sounding alarms that more time is needed inter alia to improve and implement carbon capture and sequestration systems touted as optimal means to reduce CO2 (viewed by many as the greatest GW force) in the long-term. According to Swedish and Danish scholars who have weighed in on this matter with studies focused on OGV emissions: (i) from a climate perspective, the cooling effects of SOx emissions are greater in clean air positioned far from coastal regions, (ii) geographically differentiated regulations in terms of desulfurization options may offer the best solution under the circumstances and (iii) because of serious risks that the Earth's climate system is at a tipping point, there is an urgent need to develop better strategies and metrics for regulating short lived cooling forces in the atmosphere, such as sulfates, because once they are substantially depleted (which would inevitably occur with more aggressive fuel desulfurization initiatives earmarked for the high seas), the effects of GHG-related GW are likely to become more dramatic.

Combining CADS recycling with compatible DECAT systems on OGVs is a novel solution that delivers a "double whammy" punch aimed at expediting the reversal of CC caused by GW forces. By involving the two most potent aerosol forces known to have limited life spans, the DECAT+ Recycling Solution provides aggressive reduction of warming-force BCS emissions whilst exercising controls that will selectively enable sulfate formation derived from OGV emissions of SOx/SO2 to provide vital regional cooling forces needed in the atmosphere to mitigate GW forces. This type of strategy has been validated recently by scholars who conducted extensive air sampling both at ground-level and altitudes up to 15,000 feet using unmanned aircrafts. By employing this invention, the selective engagement (or dis-engagement as the case may be) of an OGV's marine scrubber to eliminate sulfate-forming emissions is controlled by the use of programmable or "preset" DECAT+Recycling exhaust gas flow bypass valves. In contrast, none of the known marine scrubbers developed to date are designed to bifurcate the elimination of solid and soluble organic PM fractions from the elimination of SOx/SO2 and sulfate particles; thus, in order to provide sulfates, they must simultaneously emit BCS, VOC and PAH.

All things considered, the present teachings provide global solutions to economically and flexibly address the myriad of compelling health, environmental, energy and climate change concerns centered around the "dirty diesel" complex, especially in those nations that are unable to afford the extreme desulfurization campaigns adopted by much wealthier OECD countries, as well as over the high seas.

DISCUSSION

This section provides background information related to the present disclosure which is not necessarily prior art.

Diesel PM Formation and its Effects on Soot Composition

Inside a diesel engine's combustion chamber, both individual (nuclei mode) and agglomerated (after multiple nuclei mode particles have bonded) carbon particles are formed. In the exhaust system, depending on prevailing temperatures, particles undergo limited oxidation and further agglomeration.

Particles leaving the engine are traditionally divided into 3 main fractions: the solid fraction ("SOL"); the soluble organic fraction ("SOF"); and sulfate particulates. PM precursors include hydrocarbons, sulfur oxides and water, which can take the form of gases or vapors.

The SOL is comprised primarily of elemental carbon (aka inorganic carbon, black carbon or "BC"), the substance most responsible for offensive black smoke emissions that are so visible. The SOL fraction of PM also includes fullerenes, which are initially formed during combustion of light or heavy oil and adhere to BC. Certain diesel soot fullerenes (e.g. C60 and C70) are precursors for the synthesis of single walled carbon nanotubes, integral molecular components of the burgeoning nanotechnology market.

Another form of SOL is non-carbon ash formed by combustion chamber burning of additives contained in engine lubricating oil, metal oxide impurities caused by engine wear and iron oxides created by corrosion of the engine exhaust manifold and other exhaust components. DECAT systems using metallic fuel additives and catalysts to enhance prospects of filter regeneration at lower temperature levels tend to produce non-carbon ash particles. In applications where modern diesel engines are fitted with Advanced DECAT systems to maximize PM elimination, the relative importance of non-carbon ash is more significant because such ash cannot be removed via filter regeneration since it is not combustible. Thus, as the ash particles accumulate, they may result in filter blockage and increased engine backpressure, which requires more frequent cleaning of Advanced DECAT filters by mechanical means such as compressed air or water-pulse methods. In contrast, although non-carbon ash count is less significant an issue in cases where dirty old diesel engine applications employ DECAT systems compatible with this invention, whatever ash gets created can in any event be agglomerated, captured and collected along with other CADS components, subjected to the recycling method defined herein, and then ultimately reclaimed as a by-product used in construction aggregate.

Hydrocarbons adsorbed on the surface of carbon particles or present in the form of fine droplets comprise the SOF of diesel PM. The SOF portion of total PM can vary and depends mainly on engine operating conditions and exhaust temperature profiles. Lower exhaust temperatures tend to cause higher SOF levels while relatively higher engine loads and exhaust temperatures tend to cause lower SOF levels. In "wet" particulates, the SOF may constitute as much as 50% or more of total PM, indicating multi-layer hydrocarbon adsorption on the surface of the particles. In "dry" particulates, SOF content may be as low as 10% or less.

The SOF is typically composed primarily of lubricating oil-derived hydrocarbons, as well as higher boiling-end diesel fuel hydrocarbons. Lubrication hydrocarbons are believed to be major contributors to nuclei mode SOF, which are volatile nano-particles that can harm the lungs and the environment when they escape the tailpipe.

The SOF also contains most of the PAH emitted with diesel exhaust gases. PAH are aromatic hydrocarbons with multiple benzene rings joined in various, more or less clustered, forms. PAH are mutagenic, in some cases carcinogenic, so they attract special attention from government regulatory bodies under toxic air regulations. PAH can include tens of compounds, some of which have very complex structures, including rings with atoms of nitrogen or sulfur. PAH in exhaust gas are split between the gas phase (lighter, 2 ring compounds) and the particulate phase. The most harmful compounds with 4 or more rings can be found almost exclusively in the SOF of diesel PM.

Dealing with PAH content is an important issue for CB manufacturers, especially in the U.S. and E.U. where workforce regulations protect against its harmful effects. The International Carbon Black Association ("ICBA") has sponsored studies to investigate what happens when industrial CB is produced by pyrolysis of hydrocarbons at high temperatures under controlled process conditions, thereby forming unavoidable traces of impurities like PAH. One such study at the University of Dusseldorf in 2005 concluded that PAHs adsorbed on CB surfaces are not "bioavailable"; i.e., body fluids are unable to leach PAH from the CB surface. According to a prominent ICBA member, Cabot Corporation, those PAH can only be extracted from CB surfaces by using strong organic solvents under rigorous laboratory conditions (generally performed with Soxhlet extraction by toluene) at elevated temperatures, which are not representative of normal industrial processing or environmental conditions.

The present teachings provide an option for CADS to be exposed to sufficiently high TCC temperatures (if necessary, in the range of 1,300°-1,600° C. or higher) to insure that PAH levels adsorbed on CB particles meet regulatory standards. It also provides the option of converting CADS into CBFS (rather than CB per se), which can then be sold either to CB manufacturers that will finally process the material into fully compliant commercial grade CB or to other parties willing to accept CBFS for whatever secondary processing is deemed appropriate.

Sulfate particulates are composed primarily of hydrated sulfuric acid and, as such, are mostly liquid. Formation of sulfate particulates requires interaction between molecules of $H_2SO_4$ and $H_2O$. It is believed that sulfate particles are separate from carbon particles and exist in exhaust gas primarily as nuclei mode particles. Their formation depends on $H_2SO_4$ and $H_2O$ vapor pressures, which are functions of such factors as fuel sulfur level, conversion of fuel sulfur to $SO_3$, air/fuel ratio, temperature and relative humidity.

In addition to sulfuric acid, sulfate particulates may also include sulfate salts such as calcium sulfate ($CaSO_4$) formed in reactions between $H_2SO_4$ and calcium compounds originating from lubricating oil additives; they are less hydrophilic than sulfuric acid.

DECAT systems compatible with this invention are able to condense and agglomerate sulfate compounds and ultimately separate them from diesel exhaust prior to their capture and collection. Those sulfate compounds become an integral part of the CADS decomposed by this recycling invention. It should be noted that some embodiments of the present teachings may employ a scrubber device to eliminate late-stage $SO_x/SO_2$ emissions. The scrubber can be selectively bypassed in a planned and managed manner as part of Integrated DECAT+Recycling System embodiments installed onboard OGVs travelling high seas routes where sulfate emissions are deemed to be vital atmospheric cooling forces needed to expedite the reversal of CC caused by GW forces such as BCS and GHG, as more fully explained above.

Unlike Advanced DECAT systems that burn soot, which employ precious metal catalysts and filters so vulnerable to sulfur poison that they are restricted to OECD-mandated use with ULSD fuel and relatively clean modern engines, DECAT systems compatible with this invention are able to effectively operate, globally, with virtually all engines and fuels regardless of sulfur content.

Having the capability to deal on a macro scale with the residual soot effects of "dirty" diesel engines and fuels contributes to GW and CC, as well as with peculiarities tied to sulfate particulate formation and after-treatment, represent substantive novel features advanced by this invention's integration with compatible DECAT systems.

Controlled TCC Processes

TCC processes integral to this invention are more efficient and eco-friendly than the combustion or incineration of diesel PM employed in Advanced DECAT systems. Combustion is merely the oxidation of fuel for the production of heat at elevated temperatures and does so without generating useful intermediate gases, liquids or solids. Products of combustion include heat, CO2 and water. Products of incomplete combustion include CO and hydrocarbons, as well as other reaction products, most as pollutants and ash.

Whilst diesel engines combust fuel and emit pollutants, Advanced DECAT systems must incinerate PM soot before filters plug up, thereby escalating GHG emissions. Conversely, DECAT systems compatible with this invention do not rely on combustion to eliminate PM or prevent filters from plugging up. By advancing the Prior DECAT Art, this invention not only contributes to the reduction of PM and other pollutants without escalating GHG emissions but also makes optimal use of CADS as feedstock for the value-added recycling method defined herein. Thus, the present teachings also advance existing waste-to-energy art by providing a much needed fossil fuel pollution-to-energy embodiment.

The TCC process of pyrolysis decomposes suitable feedstocks in a heated reactor, usually without adding air or oxygen. Pyrolysis is the first chemical reaction to occur when solid feedstocks are burned. The various modes of Pyrolysis (torrefaction, slow, conventional, fast, etc.) are differentiated by factors affecting the kinetics of their reactions, such as heat rate (length of heating and intensity), prevailing temperature and pressure, as well as the presence of ambient atmosphere, the existence of catalysts and the physical and chemical composition of feedstock. Reactions occur over a range of temperatures and those byproducts formed initially in the process may undergo transformations in secondary reactions. Control of the sequence and rate of pyrolysis reactions, as well as factors influencing rate, determine byproduct yield and mix.

Torrefaction is a pre-treatment pyrolysis method generally carried out at 200°-300° C. to dry feedstock and enhance its calorific value. Slow/conventional pyrolysis conditions, which are typified by relatively slow heat rates, low-to-moderate temperatures (300°-750° C.) and long residence times, also cause dehydration reactions, whereby a feedstock's molecular weight is reduced and char and water vapor are formed. The byproduct mix of solids, liquids and gases tends to be relatively more balanced with slow pyrolysis.

As heat rate and temperature levels escalate, the relative portion of solids and gases are reduced and the liquid portion increases as free radicals and low molecular weight volatile compounds such as H2, CO and CO2 are formed. Increasing temperatures also reduce char formation, alter the chemical composition of char and convert non-aromatic hydrocarbons to aromatic hydrocarbons.

Fast pyrolysis conditions, typified by moderate temperatures and short residence, ultimately cause fragmentation reactions. During such reactions, feedstock is depolymerized to form oils (tars), which undergo secondary reactions depending on heat rate, temperature and pressure affecting the residence time of compounds. When medium temperatures, high pressure and long residence times are employed, volatile compounds and light oils/tars are recombined to form stable secondary tars. Under conditions of rapid heat rates, high temperatures (as much as 1,000 C) and low pressure, oils/tars vaporize and produce transient oxygenated fragments that are further cracked to yield olefins, CO, N2 and other hydrocarbons like acetol and unsaturated aldehydes. If high temperature levels are maintained for longer periods, olefins are converted to permanent hydrocarbon gases, condensable aromatic vapors and particles that can be sold as CBFS feedstock if they are not pure enough to be qualified as commercial grade CB.

Ambient atmosphere affects both the heat rate and nature of secondary reactions. In a vacuum, primary products are rapidly removed in the gas phase and unavailable for further reactions. Water or steam can in some cases speed up the breakdown of molecules. The presence of inorganic salts and acid catalysts can in some cases help lower the effective process temperature.

Chemical and physical properties of feedstock are key kinetic variables that can significantly affect pyrolysis byproduct yields and mix. Heat rate tends to be a function of feedstock size and reactor type (fixed bed, rotary kiln or heath furnace, fluidized bed, etc.). Generally, lower heat rates accompany larger particle sizes, which favor char formation. Conversely, higher heat rates accompany smaller particles, such as CADS, which favors the formation of tars and liquids.

With CADS, a fast pyrolysis process appears to be quite suitable for production of oils (tars) and vapors, which after cooling and condensing are liquefied into fuels that can be used directly in boilers and internal combustion engines, or refined for higher quality uses like motor oils, chemicals and adhesives. It also produces gases and a solid char product, as well as CB or CBFS particles (as the case may be), with the gases providing an integral recirculatable heat and power source for the pyrolysis reactor.

The controlled TCC process of gasification has emerged globally, especially in the last decade, as a preferred method to create new sources of energy from organic (aka renewable) feedstocks targeted as alternatives to fossil fuels. Gasification converts carbonaceous materials into CO and H2 via the reaction of its feedstock material, often at higher temperatures compared to pyrolysis, with controlled amounts of oxygen and/or steam, as well as other agents. The resultant gas mixture (itself a fuel) is increased at the expense of liquids and, to a lesser extent, solids. The gases may be burned directly in internal combustion engines, used to produce methanol (CH4) and H2 or converted via Fischer-Tropsch synthesis, hydrotreating, hydrocracking, Claus or other conversion processes into cleaner grades of fuels and chemicals.

A major advantage of high temperature gasification versus mere combustion (or incineration), is that gasification is a more efficient and eco-friendly process, which refines out corrosive elements, thus allowing relatively cleaner gas products to be created by otherwise problematic fuels. As mentioned above, gasification at temperatures ranging from 1,300° to 1,600° C. or even higher can enhance the elimination of PAH content on CB or CBFS.

A controlled TCC process comprised of staging pyrolysis with gasification allows more fuel liquids to be produced in lieu of gases versus that associated with mere gasification.

Employing either mere-gasification or staged pyrolysis+gasification can be attractive methods when CADS are rich in sulfate particulates. Sulfur and sulfuric acid byproducts can be reclaimed after being exposed to either a "dry" or "wet" scrubber device (various types of each are commonly available in the market), which is an eco-friendlier option vis-à-vis the Advanced DECAT system scenarios whereby more harmful sulfuric nano particles would otherwise be escaping exhaust tailpipes to nucleate in the atmosphere and penetrate lung tissue, causing health damage.

Predictive screening technologies that analyze a feedstock's kinetic and other key data derived from laboratory analytical procedures ("LAPS")—such as (i) computational fluid dynamics ("CFD") models, (ii) chemical process simulation software including but not limited to ChemCad and Aspen HYSYS and (iii) mini reactor systems that are able to assess the effects of temperature and pressure on small feedstock lots before undergoing the time and expense of scaling up to a pilot reactor—are useful tools to design, calibrate and manipulate TCC process control parameters for optimal conversion of feedstock into byproduct yields and mixes with desired economic and environmental values. Chemical engineers and other professionals commonly working in the field of TCC processing have become sufficiently proficient with those types of technologies to be able utilize them, where necessary, in the manner contemplated by the method of the present teachings.

D. LAPs that simulate TCC processes Designed to Recycle CADS

While formulating the present teachings, LAPs were conducted at an independent materials evaluation facility on CADS samples taken from a compatible DECAT system. The evaluated CADS were derived from emissions generated by a Donfeng Chayong China 3.7 liter, 4 cylinder turbocharged Euro II diesel engine burning fuel with 1,480 ppm sulfur. It is noteworthy that when the same engine and diesel fuel combination was employed with a compatible DECAT system during a 2008 emission test using European ("ECE") standards conducted at an AVL test facility in Shanghai, PM Mass was reduced from a baseline of 0.616 g/kg to a level of only 0.099 g/kg (84% reduction). LAPs noted below were chosen to simulate the effects of TCC processes employed to recycle CADS into a value-added mix of reclaimed solids, liquid fuels and gases.

Optical Microscopy Analysis of the CADS sample was used to obtain a general idea of its physical characteristics. Scanning Electron Microscopy (SEM) Analysis was also employed to provide high resolution electron images for topography, fractography and morphology, as well as crystal structure, particle sizes and shapes.

Fourier Transform Infrared (FTIR) Spectroscopy Analysis was employed to identify chemical bond functional groups by the absorption of infrared radiation, which excites vibrational modes in the bond. FTIR is especially capable of identifying the chemical bonds of organic materials, as well as organic contaminants.

Differential Scanning calorimetry (DSC) Thermal Analysis was employed to measure melting temperature, heat of fusion, reaction energy and temperature, phase transition temperature and energy, and specific heat or heat capacity. DSC Thermal Analysis measures the amount of energy absorbed or released by material when it is heated or cooled and provides quantitative and qualitative data on endothermic (heat absorption) and exothermic (heat evolution) processes. Temperatures up to 1,000° C. were employed.

Thermogravimetric Analysis (TGA) was employed to measure the amount of weight change of the CADS sample, both as a function of increasing temperatures and isothermally as a function of time, within atmospheres of helium and air to simulate the effects of gasification. The maximum temperature level employed was 1,000° C.

The LAPs performed in connection with the preparation of this invention were focused on relatively "dry" CADS that were several months removed from the compatible DECAT system referenced below. This was done to conservatively assess liquids and gases derived from TCC processes since much would have already been evaporated prior to LAPs being performed. Despite the use of this conservative approach, the DSC results noted substantial energy output at 282° C. and again at about 613° C. with the latter being larger (12.6 KJ/g), apparently due to the decomposition of PAH. TGA residues analyzed from runs at 285°, 733° and 1,000° C., in each case after encountering substantial particle weight loss (signifying release of substantial liquids and gases), all appeared as a collection of fine particles that would suffice as CBFS if not already in a form which qualifies as commercial grade CB.

It should be noted that LAPs were not performed to simulate effects of gasification within an earlier noted range of 1,300°-1,600° C. because a considerable amount of professional literature already exists to provide reasonable assurance that any residual PAH contained on CB, after such gasification, would be of a nature (i.e., non-leaching) that should result in compliance with applicable CB industry regulatory standards.

SUMMARY

This section provides a general summary of the disclosure, and is not a comprehensive disclosure of its full scope or all of its features.

The present teachings, inter alia, advances pertinent art for collecting agglomerated soot. The known prior art may define emission control systems with simple passive designs featuring exhaust cooling and wire mesh filter embodiments to agglomerate PM into larger and heavier soot dendrites that are separated from diesel exhaust streams, captured by socalled diesel particulate converters and collected in exterior storage bins or bags via reverse air-jet pulsation. A need exists in the relevant art regarding the disposal of the diesel soot its invention collects (CADS).

The present teachings provide novel advancements, inter alia, within the fields of diesel emission control and environmental and climate change remediation by defining a CADS recycling method employing controlled TCC processes to yield variable byproduct mixes with major benefits when implemented in conjunction with compatible DECAT systems including but not limited to those discussed above. The present teachings primarily target neglected markets in developing countries that are challenged with the need to fuel growth economically while dealing with a myriad of interrelated energy, health and environmental concerns having compelling global implications, as more fully explained later herein.

The present teachings recycle a harmful pollutant like CADS as a TCC process feedstock. While previously issued TCC process-based patents have defined methods to convert raw material feedstocks, such as fossil fuels (coal, oil, shale, lignite, peat, petroleum fractions) and biomass (organic waste, residues or biomass grown chemicals), into commercially reusable solids, liquids and gases, they can all be distinguished from the present teachings. In each case, the respective feedstock is introduced to pyrolysis and/or gasification processes for its thermochemical decomposition but the kinetic parameters are different because each feedstock's chemical and physical composition is distinctly unique.

As noted above, the present disclosure represents an advancement by overcoming shortcomings in the CADS disposal aspect of the Prior DECAT Art by defining a CADS recycling method employing controlled TCC processes to yield variable byproduct mixes with globally compelling benefits when implemented in conjunction with compatible DECAT systems. It primarily targets markets in developing nations challenged with the needs to fuel growth economically while dealing with a myriad of inter-related energy, health and environmental concerns having substantial global implications.

According to one aspect of the present disclosure, a method of recycling for economic and environmental benefits is accomplished by controlled TCC processing of agglomerated soot captured by and collected from compatible DECAT systems whereby the method comprises the steps of collecting captured agglomerated diesel soot ("CADS") as a feedstock, loading the CADS into a controlled TCC reactor for pyrolysis, usually without adding air or oxygen, and employing time-phased heat and pressure in the reactor until the CADS ultimately decompose sufficiently to reclaim solids, oils (tars) and vapors, and gases that are separated, collected, stored, and removed for commercial sale or submitted to additional processes specified herein. The method further comprises the step of piping oils (tars) and vapors produced in the reactor to chambers where they are cooled and condensed into liquid forms that can be used as direct fuels for boilers and internal combustion engines or refined for higher quality uses such as motor oils, chemicals and adhesives. In addition, gases produced in the TCC reactor can be recirculated as a source of heat and power that is integral to the operation of this method. The pipe flows of the byproduct oils (tars), vapors and gases are regulated by valves that open and close as directed by attendant TCC process control systems instrumented inter alia with commonly available thermocouples, pressure transducers and motor controllers for monitoring TCC temperature and pressure, as well as feedstock loading rates.

In a different aspect of the present disclosure, the CADS are alternatively loaded into a controlled TCC reactor for gasification and subjected to various temperatures of time phased heat in the presence of oxygen and/or steam to yield a byproduct mix more heavily weighted in favor of gases, which are exposed to a scrubber device before they become suitable for reuse, at which point sulfur and sulfuric acid byproducts are generated. The type of scrubber device employed may depend on various factors, in particular the location of CADS recycling (i.e., whether it is in the vicinity of freshwater or seawater). Some scrubbers use liquids, like seawater or freshwater, to wash unwanted pollutants from gas streams; others inject a dry reagent or slurry into the exhaust to eliminate acid gases; some even employ ultra-low frequency electrolysis to reduce CO2 and NOx along with SOx. Each of those types can be used with this invention.

In a further aspect of the present disclosure, byproducts reclaimed in pyrolysis are further exposed to various levels of time phased heat as part of an added stage gasification process that takes place in the presence of oxygen and/or steam to yield a byproduct mix with more liquid fuels rather than gases produced by mere gasification (as noted below).

In one more aspect of the present disclosure, an Integrated DECAT+Recycling System onboard an OGV is employed not only for TCC processing of CADS generated from the exhaust of the OGV's main and auxiliary engine(s) but also for toxic (VOC) vapors emanating from the OGV's petroleum cargo's storage area and other OGV waste as more fully described above.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 5:
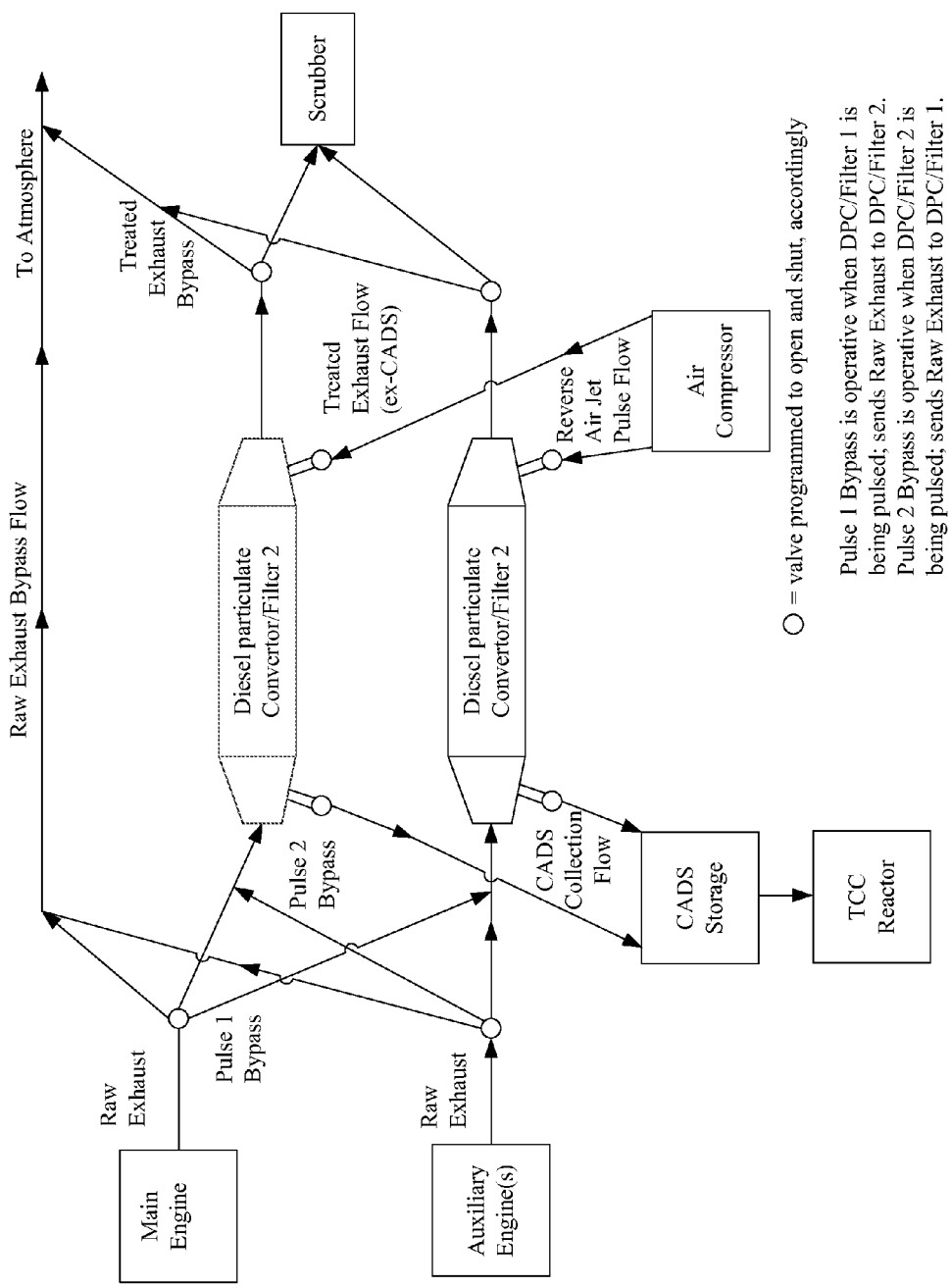

FIG. 5 is a block diagram further addressing OGV exhaust flow, the diagram further illustrating how exhaust flow bypass systems are employed to (a) prevent the vessel's main and auxiliary engines from being disrupted by the periodic collection of CADS via reverse air-jet pulsation and (b) enable the DECAT+Recycling Exhaust, which is by then rid of CADS but still rich in SOx/SO2, to selectively bypass the scrubber to facilitate formation of sulfate emissions that will provide cooling forces vitally needed in the atmosphere to expedite the reversal of CC caused by GW forces.

Other aspects and advantages of the present invention will become apparent upon consideration of the following detailed description.

DETAILED DESCRIPTION OF VARIOUS ASPECTS

Example embodiments will now be described more fully with reference to the accompanying drawings. Corresponding reference numerals indicate corresponding parts throughout the several views of the drawings.

FIGS. 1 through 5 generally aid in depicting the main embodiments and features of the present teachings. The following description is merely exemplary and is in no way intended to limit the invention, its application or uses.

Figure 1:
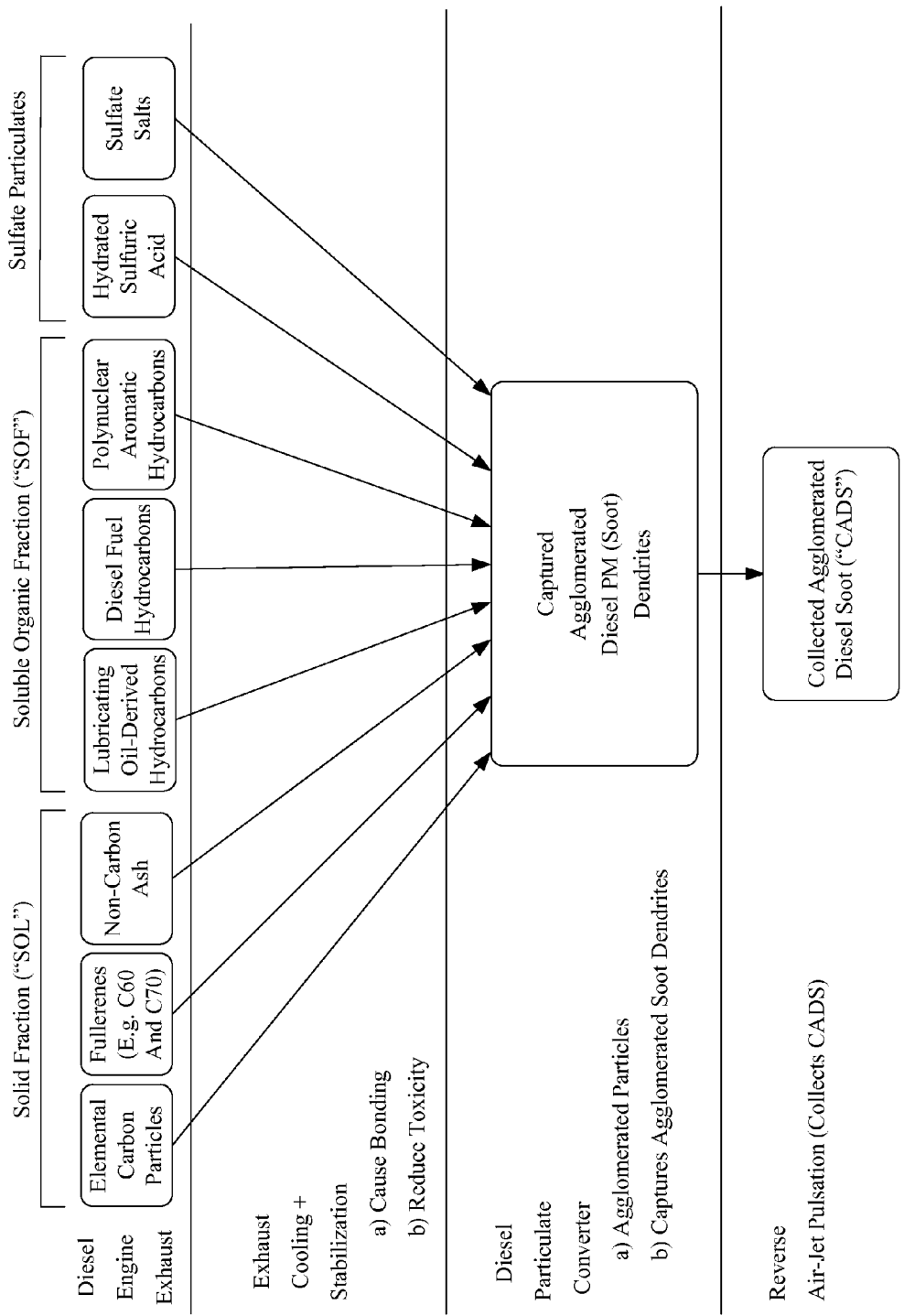
FIG. 1 is a flow chart illustrating a known diesel soot formation process, whereby the various components of PM emitted in diesel engine exhaust ultimately form CADS after flowing through compatible DECAT systems where they are agglomerated, captured and collected.

With initial reference to FIG. 1, a prior art view is provided that illustrates how CADS evolves from its origins in diesel engine exhaust to the feedstock being subjected to the present recycling method. It must be stressed that while some basic similarities exist, not all CADS feedstock batches have the same compositions or yield identical byproduct mixes because they are products of inherently different engines, fuels (especially sulfur levels), exhaust systems and DECAT systems that are compatible with this invention. Thus, employing predictive modeling technology tools to establish TCC process control schemes, parameters and instruments are helpful for the sake of safety and efficiency, as well as to maximize the value of the byproducts generated. It will be appreciated by those skilled in the art, that the present teachings may be used with CADS collected in any known manner.

CADS is an agglomerated material comprised of solid (mostly elemental black carbon in terms of mass) particles, along with soluble organic and sulfate fractions of PM that have become adsorbed thereto, as described in detail herein. Various CADS components are present in amounts ranging from less than 1% to as much as 40% or more (as in the case of elemental/black carbon). Illustratively, one typical CADS feedstock sample subjected to LAPs while in the process of formulating the present teachings was comprised of 46.0% C, 36.9% O, 5.5% Si, 1.88% Al, 1.6% Ca, 1.36% S, 1.35% Fe, 1.3% Mg, 1.09% Na, 0.96% F, 0.67% Mn, 0.64% Zn, 0.54% Ag and 0.2% P.

Several variables can impact the byproducts produced by the present teachings. For example, relative CADS "wetness" (i.e., the extent to which the SOF is adsorbed onto carbon particles or present as fine droplets) impacts the byproduct mix yielded by this recycling method. Some of the main variables impacting CADS wetness are the post-collection time which has elapsed and exposure to any environments causing vapor release prior to CADS being loaded into to the TCC reactor.

Still referring to FIG. 1, CADS feedstock generally exists as small particles seldom much larger than 10 microns in diameter. As a result, relatively few steps in terms of TCC process pre-treatment (crushing, grinding, etc.) are required, which (a) saves processing time and logistics, (b) makes CADS a good candidate for co-processing with other compatible TCC process feedstock, thereby affording recyclers the flexibility of outsourcing TCC processing if there is a desire to defer or avoid the capital costs of installing discrete facilities designed solely for this invention and (c) enhances the opportunity to co-process CADS with other sources of waste generated onboard OGVs, as described previously above and depicted more fully at FIG. 4.

Prior to CADS being subjected to TCC processing, the CADS feedstock can optionally be mixed with water, steam or hydrogen to speed up the breakdown of molecules, as well as to attract sulfur off of particles in order to enhance the recycler's ability to comply with applicable CB or CBFS commercial grade specifications (especially as to sulfur content) or if there is a desire to increase the yield of sulfuric acid byproducts. The presence of inorganic salts and acid catalysts in the reactor can in certain cases help lower effective process temperatures.

It may be useful to employ predictive screening technologies to formulate process controls and establish instrumentation and operating parameters for this recycling method. Predictive screening technologies useful for the present teachings include, but are not limited to, (a) LAPs, (b) CFD models, (c) chemical process simulation software (such as ChemCad and Aspen HYSYS to name just a few) and (d) mini reactor systems that facilitate the study of temperature and pressure effects on small feedstock lots. Each technology can be helpful to assess the above-noted and other factors when endeavoring to design, adjust or manipulate TCC process control parameters aimed at generating CADS byproduct mixes that will yield desirable economic and environmental values.

Figure 2:
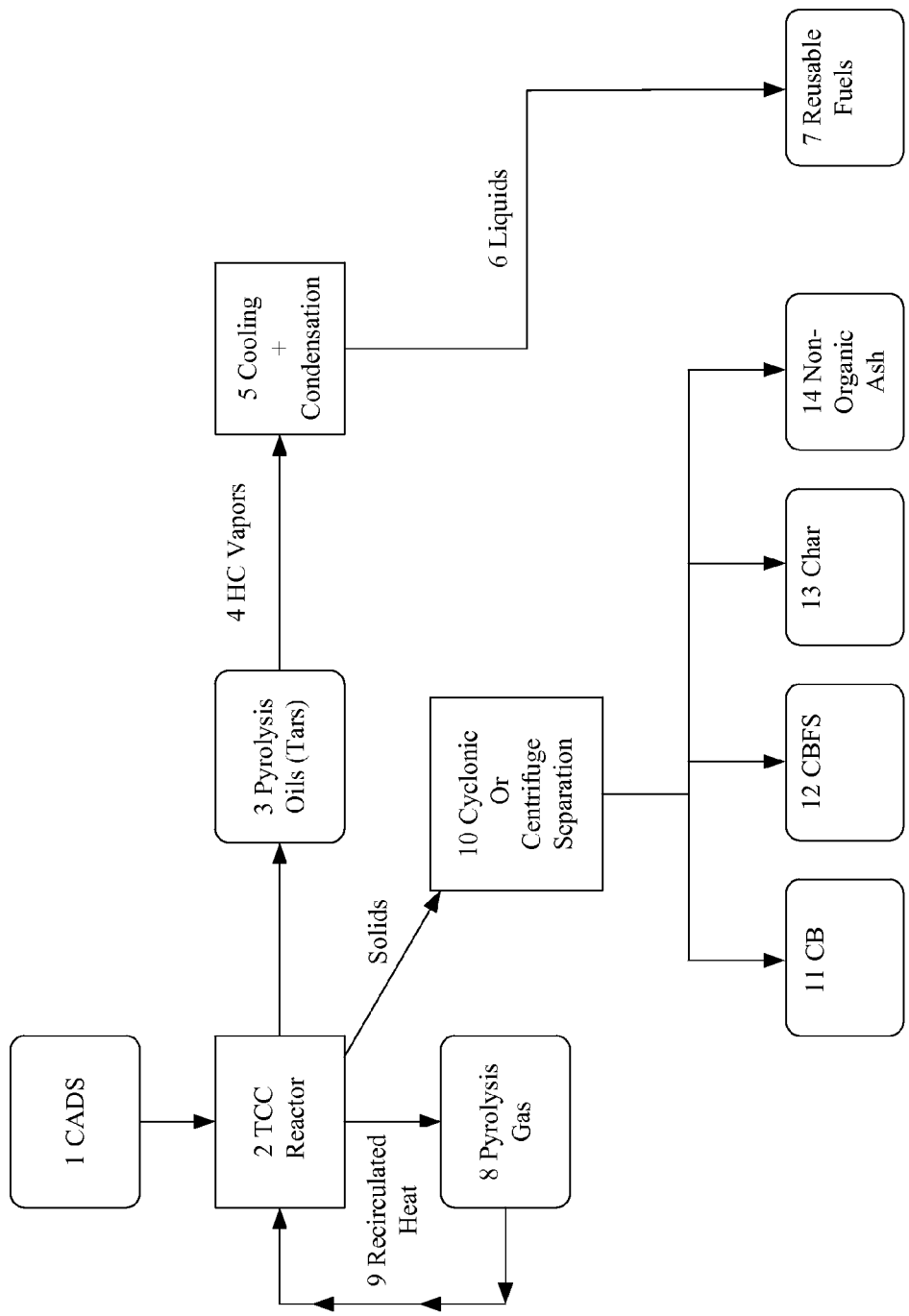
FIG. 2 is a block diagram of the present teachings, whereby CADS from FIG. 1 are subjected to controlled TCC processes based on pyrolysis.

One exemplary embodiment of the present teachings is illustrated in FIG. 2, wherein a sample CADS feedstock 1 is loaded into a controlled TCC reactor 2. Thereafter, time phased heat, atmospheric pressure and other elements, some being optional, are employed until CADS decompose sufficiently into oils (tars) and vapors, gases and solid byproducts suitable for separation, collection, storing and sale as commodities, as well as in some cases reused as integral sources of heat and power for the present teachings.

Still referring to FIG. 2, one such controlled TCC process method employable with the present teachings is pyrolysis, typically without air or oxygen. Various pyrolysis types (torrefaction, slow, conventional, fast, etc.) are differentiated by such factors as heat rate (length of heating and intensity), prevailing temperature and pressure, and the presence of ambient atmosphere. Reactions occur over a range of temperatures and byproducts formed initially in the process may undergo transformations in secondary reactions. Control of the sequence and rate of pyrolysis reactions, as well as factors influencing rate, are helpful in determining byproduct yields and mixes.

Torrefaction is a pre-treatment pyrolysis option generally carried out at about 200° C. to about 300° C. to dry CADS and enhance its calorific value. As pyrolysis temperatures reach a range of about 300° C. to about 500° C., the SOF is released from CADS to generate oils (tars) and vapors hereafter referred to as Pyrolysis Oil 3. Common SOF include those previously disclosed herein. The SOF comes off in stages as the temperature rises.

As noted at FIG. 2, pyrolysis oil 3 and vapors 4 may be piped to a cooling and condensation chamber 5 where they are liquefied 6 and stored as reusable fuels 7. The reusable fuels may be burned directly in boilers and internal combustion engines or refined for higher quality uses such as motor oils, chemicals and adhesives.

As temperatures in the TCC reactor reach the range of approximately about 500° C. to about 750° C., additional reactions take place whereby gases, hereby referred to as pyrolysis gas 8 are formed. The generated heat can be recirculated back to the reactor to provide a source of heat and power 9 that is integral to the method defined herein.

As pyrolysis temperatures in the TCC reactor near approximately 1,000° C., the CADS generally have been broken down sufficiently to reclaim solid commercial grade byproducts that can ultimately be separated. Separation typically takes place via cyclone or centrifuge 10 but other methods of separation known in the art can be employed as well. After the solid byproducts are separated, they are removed, stored and ultimately sold as commodities, i.e., CB 11 or CBFS 12 (as the case may be), char 13 and non-organic ash 14.

CB, CBFS, char and hydrocarbon vapors in FIG. 2 can be extracted for introduction as feedstock in any of a variety of fullerene related processes including but not limited to laser vaporization (or ablation), thermal gradient chemical vapor deposition and electric-arc discharge, so that fullerenes such as C60 and C70 can be formed to become precursors for the synthesis of single-walled carbon nanotubes. Alternatively, the CADS taken from FIG. 1 can first be subjected to any of the aforementioned fullerene related processes for the same purpose, with the net residual CADS materials (ex-fullerenes) thereafter being loaded into a TCC process reactor and subjected to the same processes as depicted at the starting point of FIG. 2.

Figure 3:
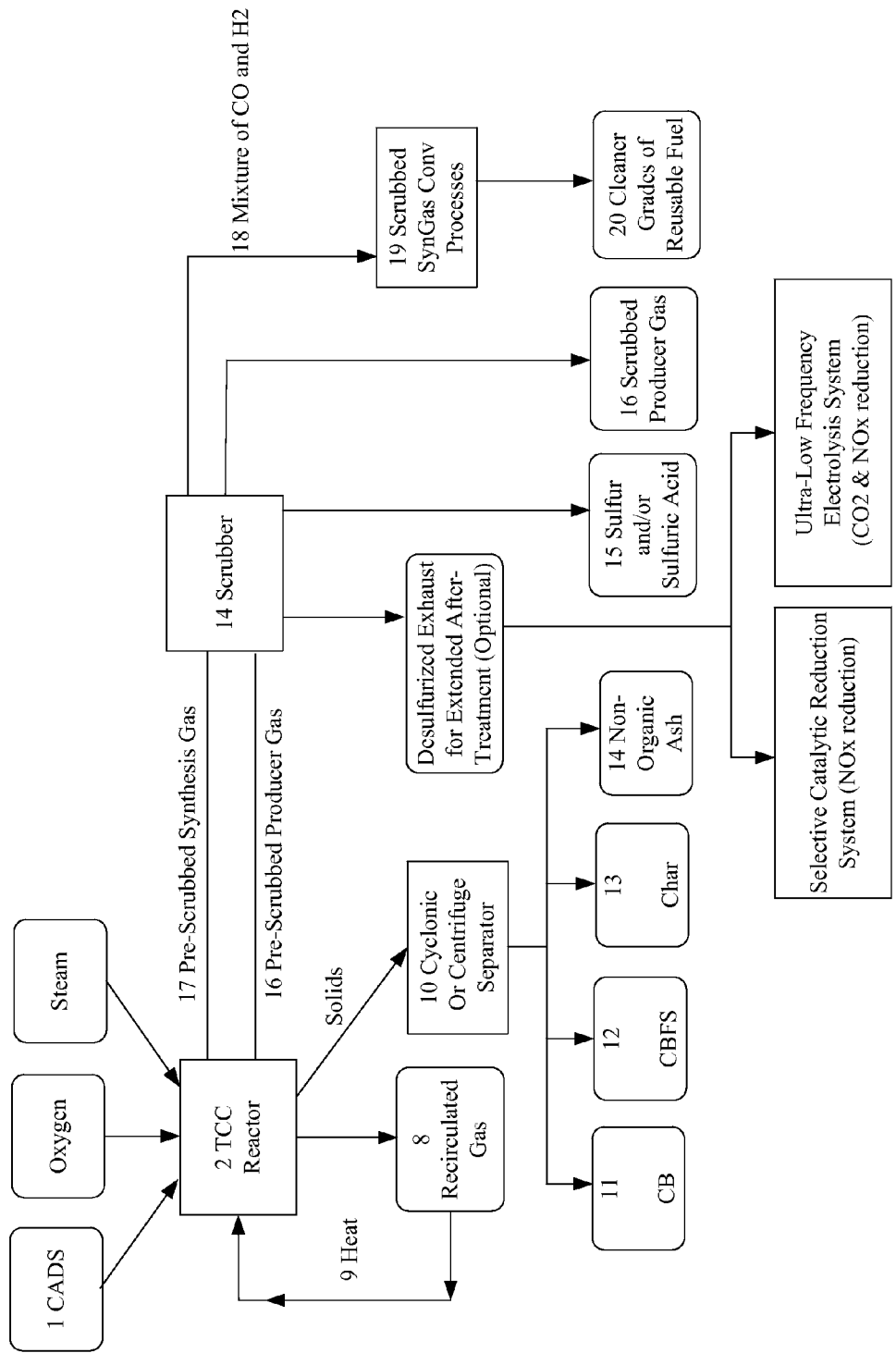
FIG. 3 is a block diagram of the present teachings, whereby CADS from FIG. 1 are subjected to controlled TCC processes based on gasification.

FIG. 3 depicts another controlled TCC process method in accordance with the present teachings. As illustrated, the present teachings employ low and/or high temperature gasification with time phased heat in the presence of oxygen and/or steam. The objective is to yield a byproduct mix more heavily weighted in favor of gases, hereafter referred to as producer gas 16 and synthesis gas 17.

Producer gas 16 is achieved by relatively low temperature gasification which generally takes place at about 500° C. to about 750° C. to yield a mixture of CO and H2, CO2 and a range of hydrocarbons such as methane (CH4) with nitrogen (N) from the air. The resulting mixture can ultimately be burned in a boiler for heat or in an internal combustion gas engine for electricity or combined heat and power.

Synthesis gas is achieved by relatively higher temperature gasification which normally takes place in the range of about 750° C. to about 1,000° C. or higher in some cases, to yield a mixture 18 of CO and H2, which after being cleaned up to remove impurities, can be used to produce methanol and hydrogen that are transformable into cleaner grades of reusable fuel 20 by other conversion processes 19 including but not limited to Fischer-Tropsch synthesis, Claus, hydrotreating and hydrocracking.

Producer gas 16 and synthesis gas 17 are passed through a scrubber device 14 to remove SOx/SO2 prior to their reuse or subsequent conversion to other higher value byproducts. Scrubbers that are generally available for this purpose include a diverse group of air pollution devices that can be used to remove particulates and/or gases (such as SOx/SO2) from industrial and other exhaust streams, as mentioned above.

Byproducts produced by exposing producer gas 16 and synthesis gas 17 to a scrubber device 14 primarily include sulfur and sulfuric acid 15, as well as ash.

It will be appreciated that the teachings of FIGS. 2 and 3 may be combined to yield yet another controlled TCC process method employable by the present teachings. Such a combination is comprised of staging pyrolysis+gasification (essentially already illustrated via the combined effects of FIGS. 2 and 3) to yield a byproduct mix favoring more liquid fuels than would otherwise be produced by mere gasification.

The present teachings call for CADS to be exposed in certain cases to sufficiently high TCC process temperatures (as much as about 1,300° C. to 1,600° C. or even higher, if necessary) to insure that the nature and level of PAH adsorbed on finished CB particles meets applicable regulatory standards. The present teachings also provide an option to convert CADS processed by this invention into a CBFS byproduct (rather than CB per se) for the purpose of selling it to CB manufacturers that can ultimately process it into a fully compliant commercial grade of CB.

Figure 4:
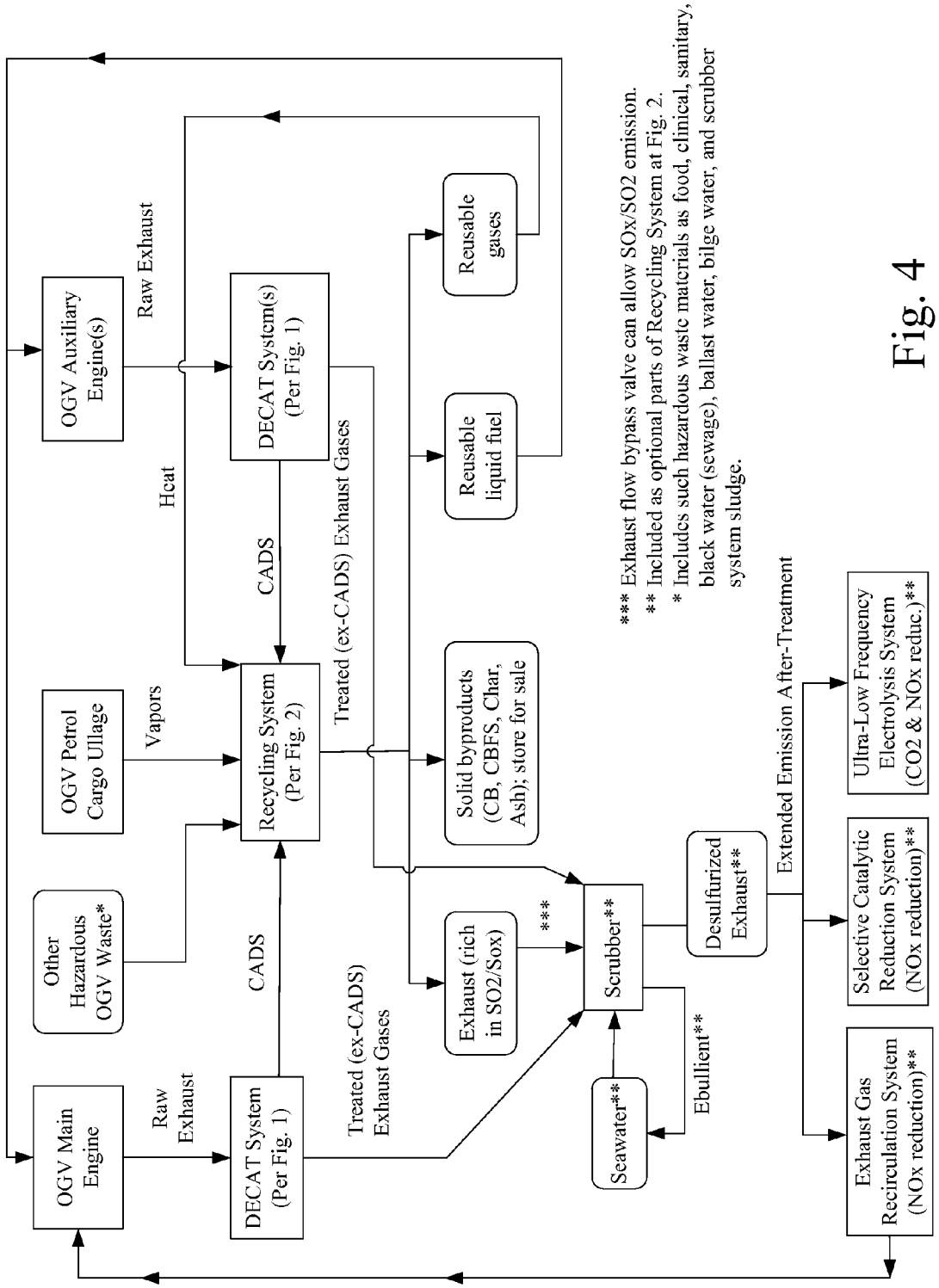
FIG. 4 is a block diagram of an alternate embodiment of a process in accordance with the present invention, whereby an Integrated DECAT+Recycling System operates onboard an OGV.

FIG. 4 illustrates how an Integrated DECAT+Recycling System functions onboard an OGV, which includes but is not limited to passenger yachts, ships and oceanliners, container ships, bulk carriers, ro-ro-ships, reefers, dry cargo ships, crude oil, chemical and gas tankers, navy vessels and other supply ships, in order to accomplish the following:

(i) agglomerate, capture and collect (per FIG. 1) and recycle (per FIG. 2) CADS (especially BCS, VOC, PAH fractions) generated by OGV exhaust, as well as various forms of OGV hazardous waste identified more fully above with the liquid fuel byproducts being reused in the vessel's main or auxiliary engines, the gas byproducts recirculated to provide an integral source of heat and power for the TCC reactor and solid byproducts (principally CB and CBFS) being stored for resale;

(ii) convert toxic (VOC) vapors extracted from the ullage spaces in the OGV's petroleum cargo storage sections into liquid fuels using relevant facets of this invention's recycling system;

(iii) scrub the DECAT+Recycling treated exhaust gases (net of BCS, VOC and PAH but typically rich in SOx/SO2) with readily available and naturally buffering seawater in cases where there is a need to facilitate OGV compliance with IMO and ECA fuel and emission regulations; alternatively, selective (programmed) air flow bypass valves can be employed on a planned and managed basis in order for the previously treated exhaust gases to bypass the scrubber, thus facilitating the formation of sulfate particles in the atmosphere where their vitally important cooling forces are desired to expedite the reversal of CC caused by GW forces, as depicted in more detail at FIG. 5;

(iv) alternatively employ an ultralow frequency electrolysis scrubber to reduce CO2 and NOx along with SOx/SO2 in cases where that is a desired emission strategy; and (v) subject the previously treated sulfur-depleted exhaust to an extended after-treatment option in the form of EGR or SCR if NOx reduction is a desired emission strategy to be pursued in lieu of the option noted in (iv) directly above.

It will readily be appreciated by those skilled in the art that the devices referenced above in (iii) through (v) can also be applied at land based CADS recycling facilities, especially those that are installed in the proximity of seawater.

FIG. 5 illustrates how to prevent disruption in OGV exhaust flow (and in effect the OGV's main and auxiliary engines) that could otherwise be caused by the periodic collection of CADS via reverse air-jet pulsation. In order to prevent such disruptions, an automatic system of pulsing is employed, which uses valves preset by programmable timers to (a) periodically close off the inlet and outlet sections of the attendant diesel particulate filters (or "converters", as labeled by the Prior DECAR Art), (b) effectuate the pulsing operation which sends CADS to a collection chamber where the material is held prior to this invention's recycling facets, and (c) reopen the inlet and outlet sections of the converter for resumed filtration. When one set of converter filters is closed off for pulsation, OGV exhaust is redirected to other converter filter sets within the context of a multiple converter filter arrangement. In addition, as mentioned earlier, FIG. 5 illustrates how DECAT+Recycling exhaust, which is by then rid of CADS but still rich in SOX/SO2, can selectively bypass the scrubber to allow sulfate emissions to provide cooling forces that are vitally needed in the atmosphere to expedite the reversal of CC caused by GW forces.

The present disclosure contemplates implementation in connection with compatible DECAT systems that generate CADS, involving either OEM or retrofit applications onto, inter alia, trucks, buses, construction vehicles and equipment, agricultural vehicles and equipment, power generators and OGVs. In particular, it is contemplated that the present teachings may be implemented in connection with applications that employ diesel fuels having sulfur content of 350+ ppm and especially when sulfur content exceeds 1,000 ppm. As a result, this invention is particularly well suited for markets in developing countries populated by many high-emitter (aka superemitter) engines and challenged with needs to fuel growth economically while dealing with a myriad of inter-related energy, health, and environmental concerns that have substantial global implications, as described more fully above.

Accordingly, the present teachings provide a system and method for recycling agglomerated diesel soot collected from emissions control systems for the purpose of being a TCC reactor feedstock and then subjecting the CADS feedstock to various treatment steps designed to decompose it into valuable byproducts that are reclaimed, separated and removed for commercial use.

Numerous modifications to the present teachings will be apparent to those skilled in the various arts relevant, thereto, in view of the foregoing description. Accordingly, the descriptions provided herein are to be construed as illustrative only and presented for the purpose of enabling those skilled in the art to make and use the invention and to teach the best mode of carrying out the same. For example, a third controlled TCC process, based on staged pyrolysis+gasification, is not illustrated in an accompanying diagram since it would essentially be redundant of FIGS. 2 and 3. The exclusive rights to all modifications which fall within the scope of the appended claims are hereby reserved.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. In this regard, each of the embodiments described herein may be modified to include any of the structures or methodologies disclosed in connection with different embodiments. Such variations are not to be regarded as a departure from the disclosure, and all such modifications are intended to be included within the scope of the disclosure.

| Acronyms |
| --- |
| ASTM: American Society for Testing & Materials |
| BC: Black Carbon |
| BCS: Black Carbon Soot |
| CADS: Captured Agglomerated Diesel Soot |
| CB: Carbon Black |
| CBFS: Carbon Black Feedstock |
| CC: Climate Change |
| CFD: Computational Fluid Dynamics |
| DECAT: Diesel Emission Control After-Treatment |
| DSC: Differential Scanning Calorimetry |
| ECA: Emission Controlled Areas |
| ECE: Emission Cycle European |
| EGR: Exhaust Gas Recirculation |
| EPA: Environmental Protection Agency |
| FTIR: Fourier Transform Infrared |
| GHG: Greenhouse Gas |
| GW: Global Warming |
| ICBA: International Carbon Black Association |
| IMO: International Maritime Organization |
| IPCC: International Panel on Climate Change |
| LAPS: Laboratory Analytical Procedures |
| OECD: Organization for Economic Co-operation and Development |
| OEM: Original Equipment Manufacturer |
| OGV: Oceangoing Vessel |
| PAH: Polynuclear (aka Polycyclic) Aromatic Hydrocarbon |
| PM: Particulate Matter |
| SCR: Selective Catalytic Reduction |
| SEM: Scanning Electron Microscopy |
| SOF: Soluble Organic Fraction |
| SOL: Solid Fraction |
| TCC: Thermochemical Conversion |
| TGA: Thermogravimetric Analysis |
| ULSD: Ultra-Low-Sulfur-Diesel |
| UN: United Nations |
| VOC: Volatile Organic Compound |

What is claimed is:

1. A method of recycling captured agglomerated soot captured by and collected from a diesel emission control after-treatment (DECAT) system, the method comprising:
collecting captured agglomerated diesel soot (CADS) as a feedstock;
loading the CADS into a controlled thermochemical conversion (TCC) process reactor;
employing time-phased heat and pressure a controlled TCC process reactor until the CADS sufficiently decompose to reclaim solids, liquid fuels and gases;
piping pyrolysis oils (tars) and vapors produced in the controlled TCC process reactor to chambers;
cooling and condensing the pyrolysis oils and vapors into a liquid form; and
recirculating a pyrolysis gas produced in the controlled TCC process reactor for use as a source of heat and power.

2. The method of claim 1, wherein the liquid form is useable as a direct fuel for boilers and internal combustion engines and refinable for use as motor oil, chemicals and adhesives.

3. The method of claim 1, further comprising employing a pyrolysis treatment of torrefaction carried out at 200°-300° C. to dry the CADS to enhance calorific value.

4. The method of claim 1, further comprising mixing the CADS with water and/or steam to speed up a breakdown of molecules, as well as to provide hydrogen that attracts sulfur fraction of CADS to yield more sulfuric acid byproducts and/or insure that CB or CBFS byproducts are sufficiently void of sulfur content to meet applicable commercial standards.

5. The method of claim 4, further comprising providing inorganic salts and acid catalysts to lower an effective molecular breakdown process temperature.

6. The method of claim 1, further comprising employing a process of fast pyrolysis to yield a byproduct mix comprised of relatively more liquid fuels and fewer gases.

7. The method of claim 1, further comprising employing a process of slow pyrolysis to yield a relatively more balanced mix of solid, liquid fuel and gas byproducts.

8. The method of claim 1, wherein the heat employed in the TCC process reactor is at least 1,000° C. in an absence of oxygen for pyrolysis.

9. The method of claim 1, further comprising loading the CADS into a TCC reactor and gasified with temperatures of time phased heat employed in a presence of oxygen and/or steam to yield a byproduct mix more heavily weighted in favor of gases.

10. The method of claim 1, comprising:
first subjecting CADS in the controlled TCC process reactor to pyrolysis; and
later gasifying the CADS in a presence of oxygen and/or steam.

11. The method of claim 9, wherein gasification heat employed in the controlled TCC process reactor can be elevated to temperature levels ranging from 1,300°-1,600° C., if necessary, to reduce PAH adsorbed onto CB or CBFS byproducts.

12. The method of claim 9, wherein gasification reactions in the controlled TCC process reactor at relatively low temperatures ultimately yield producer gas with a mixture of hydrocarbons that can be burned in a boiler for heat or in an internal combustion gas engine for electricity generation or combined heat and power.

13. The method of claim 9, wherein gasification reactions in the controlled TCC process reactor at relatively higher temperatures (compared to those generating producer gas) in the presence of oxygen and/or steam ultimately yield synthesis gas with a mixture of CO and H2, which can be used to produce CH4 and H2 that can be submitted to Fischer-Tropsch synthesis, hydrotreating, hydrocracking, Claus or other conversion processes to produce cleaner grades of fuels and chemicals.

14. The method of claim 9, wherein producer gas and synthesis gas are passed through a scrubber device to remove SOx/SO2 prior to such gases being reused or ultimately converted to other higher value byproducts.

15. The method of claim 14, wherein the scrubber device uses a liquid selected from a group consisting of seawater and freshwater to wash unwanted pollutants from gas streams; or inject a dry reagent or slurry into the gas stream, which after drying yields a gypsum byproduct; or employ an ultra-low electrolysis process to reduce CO2 and NOx along with SOx.

16. The method of claim 1, wherein reclaimed solids, including char, CB, CBFS and non-carbon ash, are separated inter alia by a cyclone or centrifuge, collected, bagged and then be readied for commercial sale as commodities.

17. The method of claim 1, wherein reclaimed char, CB and CBFS, as well as hydrocarbon vapors moving from the TCC process reactor to condensation and cooling chambers, are extracted for introduction as feedstock into any of a variety of processes including but not limited to laser vaporization (or ablation), thermal gradient chemical vapor deposition and electric-arc discharge.

18. The method of claim 1, wherein CADS are subjected first to processes including but not limited to laser vaporization (or ablation), thermal gradient chemical vapor deposition and electric-arc discharge, after which point a residual material is collected and introduced as a feedstock to a controlled TCC reactor to be pyrolyzed and/or gasified.

19. The method of claim 17, further comprising forming precursors for synthesis of engineered nanomaterials.

20. The method of claim 1, wherein CADS feedstock samples are subjected to predictive screening technology tools, including but not limited to laboratory analysis procedures (LAPS), computational fluid dynamics models, chemical process simulation software and mini reactor systems that are able to facilitate study of effects of temperature and pressure on small feedstock lots, prior to the CADS being processed by the methods defined herein, with such predictive screening tools being used to design, adjust and manipulate process control parameters in order to maximize safety and conversion of feedstock into byproduct mixes yielding desired economic and environmental values.

21. A method of recycling captured agglomerated soot captured by and collected from a diesel emission control after-treatment (DECAT) system, the method comprising:
    collecting captured agglomerated diesel soot (CADS);
    loading the CADS into a controlled thermochemical conversion (TCC) process reactor; and
    employing time-phased heat and pressure in the controlled TCC process reactor until the CADS sufficiently decompose to reclaim solids, liquid fuels and gases.

* * * * *